No. 775,759. PATENTED NOV. 22, 1904.
H. MEINECKE.
FENCE.
APPLICATION FILED MAR. 2, 1904.
NO MODEL.
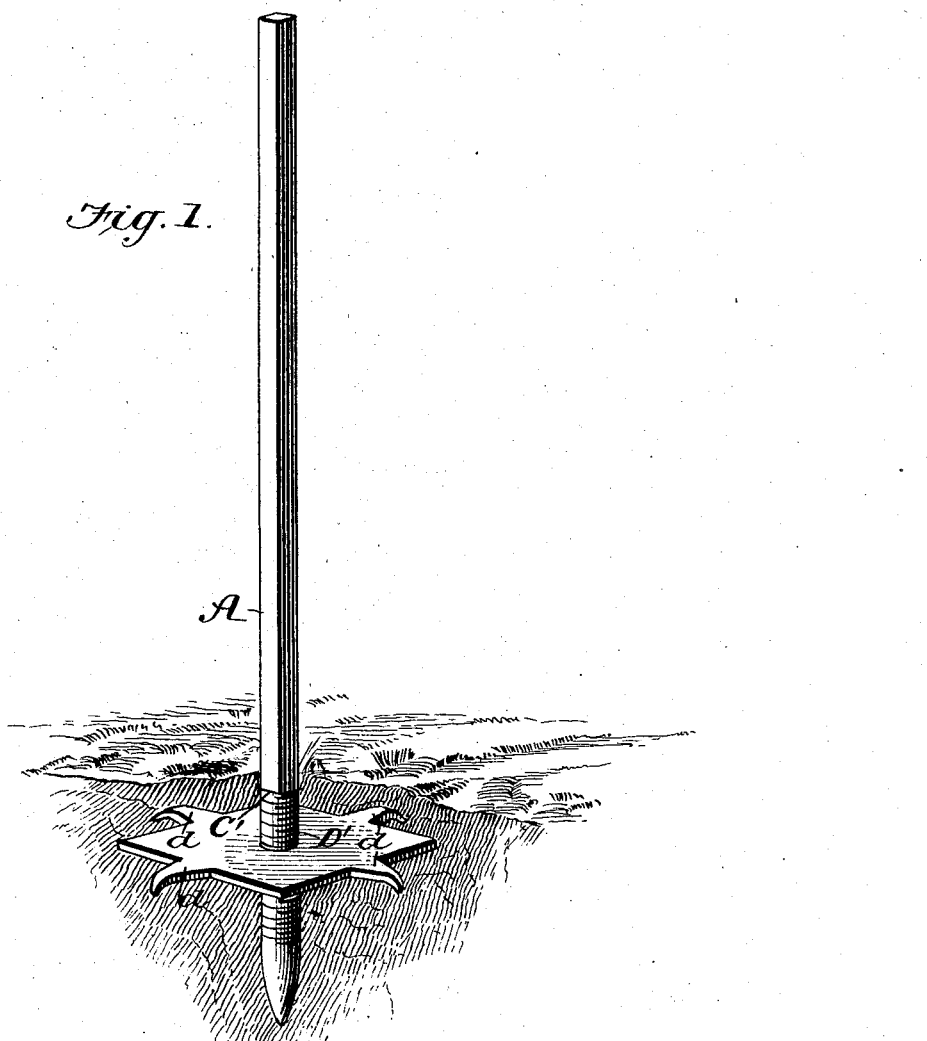
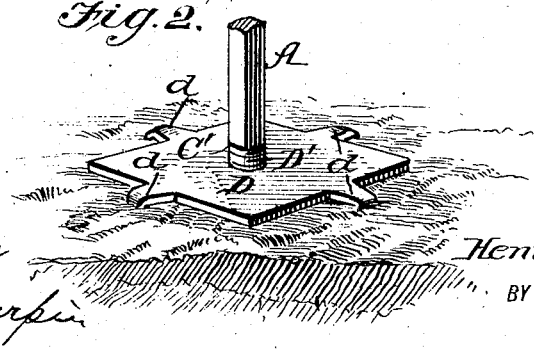

No. 775,759.

Patented November 22, 1904.

UNITED STATES PATENT OFFICE.

HENRY MEINECKE, OF TOMAH, WISCONSIN.

FENCE.

SPECIFICATION forming part of Letters Patent No. 775,759, dated November 22, 1904.

Application filed March 2, 1904. Serial No. 196,229. (No model.)

*To all whom it may concern:*

Be it known that I, HENRY MEINECKE, a citizen of the United States, and a resident of Tomah, in the county of Monroe and State of Wisconsin, have made certain new and useful Improvements in Fences, of which the following is a specification.

My invention is an improvement in fences; and it consists in certain novel constructions and combinations of the post and its anchor-plate, as will be hereinafter described and claimed.

In the drawings, Figure 1 is a perspective view of a fence embodying my invention, and Fig. 2 is a detail perspective view showing the base-plate resting upon the surface of the ground.

In the construction shown the post A is threaded at its lower end at C' and turns at its threaded portion through an opening D' in the base-plate D, which latter may be rested upon the surface of the ground, as shown in Fig. 2, or may be sunk in the ground, as shown in said figure of the drawings. This plate D is provided at its outer edge with spur-like projections $d$, which may be bent down slightly at their outer ends at $d'$ to enter the ground, as shown in Fig. 1. It will be noticed that by the threaded connection between the posts and the base-plates the posts may be adjusted through the base-plates to any desired extent and will be firmly engaged with said plates in any adjustment.

It will be understood that my improved post can be used in any kind of soil and can be sunk to any desired depth to prevent the post from leaning and from the said post being loosened by the action of frost. It will also be understood that the post can be used at corners or at intermediate points.

It will be noticed that the arms extend laterally from and beyond the edges of the base-plates D and are deflected downwardly at their outer ends to increase the hold of the base-plates in the ground. This special construction of the arms provides the spurs and also provides a lateral extension of the base-plates, so that I am able to secure the greatest holding power by said plates with the least amount of material, the construction being easily applied and efficient in use, as will be understood from the drawings and the foregoing description.

Having thus described my invention, what I claim as new, and desire to secure by Letters Patent, is—

The combination of a post threaded at its lower end, and the base-plate having an opening for the post and provided at its edges with the laterally-extending spur-like arms projecting downwardly at their outer ends and forming extensions laterally beyond the edges of and below the base-plate, substantially as shown and described.

HENRY MEINECKE.

Witnesses:
WM. B. NAYLOR, Jr.,
WM. R. MCCOWL.